US008626479B2

(12) United States Patent
Wang (10) Patent No.: US 8,626,479 B2
(45) Date of Patent: Jan. 7, 2014

(54) CLIENT LOAD SIMULATION FRAMEWORK

(75) Inventor: Zheng Wang, Gaithersburg, MD (US)

(73) Assignee: Mircosoft Corporation, Redmond, WA (US)

( * ) Notice: Subject to any disclaimer, the term of this patent is extended or adjusted under 35 U.S.C. 154(b) by 864 days.

(21) Appl. No.: 12/548,609

(22) Filed: Aug. 27, 2009

(65) Prior Publication Data

US 2011/0054841 A1 Mar. 3, 2011

(51) Int. Cl.
*G06F 17/50* (2006.01)

(52) U.S. Cl.
USPC .......................................................... 703/13

(58) Field of Classification Search
USPC .......................................................... 703/13
See application file for complete search history.

(56) References Cited

U.S. PATENT DOCUMENTS

| | | | | |
|---|---|---|---|---|
| 5,812,780 | A * | 9/1998 | Chen et al. | 709/224 |
| 6,230,142 | B1 | 5/2001 | Benigno et al. | |
| 6,295,557 | B1 * | 9/2001 | Foss et al. | 709/224 |
| 6,324,492 | B1 * | 11/2001 | Rowe | 703/13 |
| 7,339,891 | B2 * | 3/2008 | Binder et al. | 370/231 |
| 2003/0156549 | A1 * | 8/2003 | Binder et al. | 370/252 |
| 2008/0077375 | A1 | 3/2008 | Fernandez | |

OTHER PUBLICATIONS

Jafer, et al., "Modeling Remote System for Sensor Monitoring using Verilog HDL and SIMULINK Co-Simulation", Retrieved at <<http://ieeexplore.ieee.org/stamp/stamp.jsp?arnumber=01518189>>, 2005 IEEE, pp. 64-69.

Cunha, et al., "A First Approach for a Regional Wide VEPR", Retrieved at <<http://www.dcc.fc.up.pt/~lfa/healthinf08-vepr.pdf>>, "HEALTHINF 2008—International Conference on Health Informatics", pp. 215-218.

Ammar, et al., "The Development of a Client/Server Architecture for Standardized Medical Application Network Services", Retrieved at <<http://ieeexplore.ieee.org/stamp/stamp.jsp?arnumber=00756745>>, May 18, 2009, pp. 8.

Smith, et al., "A Real-Time Hand Gesture Interface for Medical Visualization Applications", Retrieved at <<http://www.movesinstitute.org/~jpwachs/papers/WSC10_wachs.pdf>>, pp. 13, 2006.

(Continued)

*Primary Examiner* — Dwin M Craig
(74) *Attorney, Agent, or Firm* — Gonzalez Saggio & Harlan LLP (57) ABSTRACT

Described is a technology for load testing a service such as a medical data service (e.g., Microsoft Amalga® UIS) with mixed test sets. Simulated users perform randomly selected operations against the service. State machines are created to represent the simulated users, with the operations arranged within states of the state machine. By randomly selecting each state and its operations, the actions of many real users may be simulated, providing a realistic load test of the service. Moreover, to match certain types of usage scenarios, the states in a state machine may be weighted relative to one another so that the random selection is biased in favor of more weighted states. Similarly, each operation within a state may be weighted relative to each other operation within the same state, so that when a state is determined, the random selection is biased in favor of more weighted operations within that state.

10 Claims, 4 Drawing Sheets

(56) References Cited

OTHER PUBLICATIONS

Osl et al., "A Cellular Automaton Framework for Infectious Disease Spread Simulation", Retrieved at <<http://www.pubmedcentral.nih.gov/articlerender.fcgi?artid=2666960>>, Apr. 24, 2008, pp. 1-10.

Grishman, et al., "Information Extraction for Enhanced Access to Disease Outbreak Reports", Retrieved at <<http://nlp.cs.nyu.edu/publication/papers/grishman-bioinf02.pdf>>, pp. 1-15, 2002.

Fraser et al., "Factors that Make an Infectious Disease Outbreak Controllable", Retrieved at <<http://www.episouth.org/outputs/wp5/s_t_module/articles/Factors%20to%20control%20outbreaks.pdf>>, Apr. 20, 2004, vol. 101, No. 16, pp. 6146-6151.

Rudie, et al., "Near-Optimal Online Control of Dynamic Discrete—Event Systems", Retrieved at <<http://research.cs.queensu.ca/home/grigorov/nearoptimal.pdf>>, pp. 1-29, 2006.

* cited by examiner

CLIENT LOAD SIMULATION FRAMEWORK

BACKGROUND

Microsoft Amalga® UIS is a unified intelligence system/ service that provides client users with access to clinical data. The amount of clinical data including medical records that is maintained for patients can be vast, as can the number of concurrent users accessing the data and number of varied scenarios in which users access the system.

In order for such a system (or similar system) to be evaluated and improved, load testing (including stress and reliability testing) needs to be performed. However, given the large amount of data and the complicated patterns in which users may access the data, known load testing techniques are not able to realistically simulate client loads when using such a service.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a service is realistically load tested by simulated users performing random operations against the service. In one aspect,.state machines are created to represent the simulated users. Each state machine contains a plurality of states, and each operation in a state machine is associated with one of the states. By randomly selecting states and operations within states according to the state machine's current working context, the actions of many real users may be simulated, providing a realistic load test of the service.

For each simulated user, an operation is selected to perform based upon a random number that determines the state and operation within that state. States may be weighted relative to one another so that the random selection is biased in favor of more weighted states. Further, each operation within a state may be weighted relative to each other operation within the same state, so that when a state is determined, the random selection is biased in favor of more weighted operations within that state.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards simulating a realistic user load on a service such as Amalga® UIS via random user scenarios, for application server load/stress/reliability testing. In one aspect, this is accomplished via a load simulation framework that is based on random simulated user actions; for example, a random user may log in, receive a random list of patients (e.g., corresponding to a random time range), and perform operations that may randomly change as if an actual user was interacting with a user interface making choices. Multiple simulated users may do this in parallel. Note that any subset of the patients may be provided, and schemes other than random selection may be used to select such a subset.

It should be understood that any of the examples herein are non-limiting. Indeed, as one example, the testing technology described herein may be used for simulating load on any service having a large set of data against which operations may be performed, not only clinical modules and data (such as in Amalga® UIS). As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and testing in general.

Figure 1:
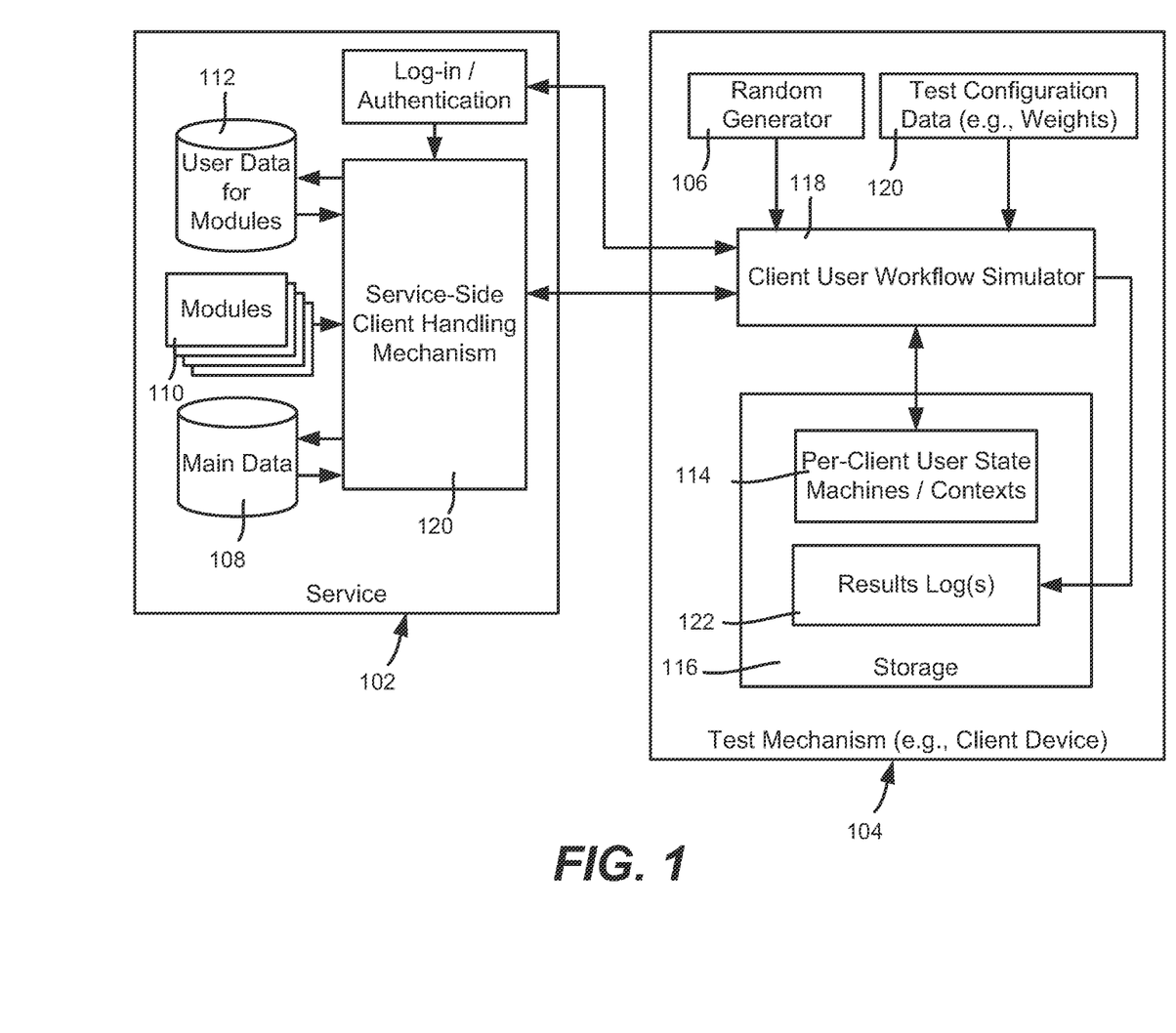
FIG. 1 is a block diagram representing example components for preloading modules for load testing a service with a simulated client load.

Turning to FIG. 1, there is shown a block diagram representing example components for testing a service 102 from via test mechanism 104, e.g., running in a client computing device or on multiple client computing devices. In general, a random generator 106 provides random numbers as needed, including to facilitate the logging in of a random simulated user, e.g., with appropriate "testing" credentials that the service 102 recognizes as valid. In this way, multiple simulated users can be dynamically generated so as to simultaneously perform various (e.g., random) operations against various (e.g., random patient) data. Note that as used herein, "against the service" means any performing action that causes the service to take an action in response, e.g., to login a user, provide a module, provide some data, log user activities, and so forth.

In the example of Amalga®) UIS, a user can access patient data 108 through various modules 110 which are loaded as appropriate for the type of data. For example, an x-ray image or the like may be viewed through an image viewer module, a lab viewer module can be used to view lab records, and so forth. Note that different modules may correspond to different databases, and thus it is valuable to load test for these differences.

Further, note that in such a privacy-controlled service/ system, only certain users may load certain modules (as represented by the data store 112). Thus, random selection of a simulated user allows different types of tests/modules to be run at the same time.

Once a simulated client user is logged in, each client user scenario is modeled as a state machine (with context) 114, e.g., in a device storage 116. Note that having each simulated user be represented as a state machine allows dynamically building a context to which user operations can read and write, for keeping a current list of patients for the user, to select random operations and store information about those operations to allow the next selection and performance monitoring, and so forth. Such dynamic context building is advantageous when there are millions of patients, as a list of all patient identifiers need not be maintained for load testing; (doing so may not even be practical).

For example, at login, different users may randomly select different date ranges (scopes), and thereby randomly load different lists of patients. Each simulated user may then randomly select among different patients in that user's list to perform operations against that user's data, e.g., to select a patient, to load the patient's chart for simulated viewing, and so on.

Logic (e.g., program code) represented in FIG. 1 as the client user workflow simulator 118 controls the timing of state changes (e.g., between operations) and communicates with a service-side client handling mechanism 120 to perform the requested operations and thereby load test the service 102. At each state, each simulated user may have multiple operations (test cases) from which to choose. Operation selection is random, however weighted selection (described below) as configured by a tester (block 120) may bias the selection to select more operations of one type than another type.

Note that the time taken to perform any operation may be simulated, which also may be based on random number generation. For example, varying times may be used to simulate how long an actual user would review some piece of data (e.g., a patient list) before requesting another operation (e.g., selection of one patient) and so on (e.g., review the selected patient's chart).

Figure 2:
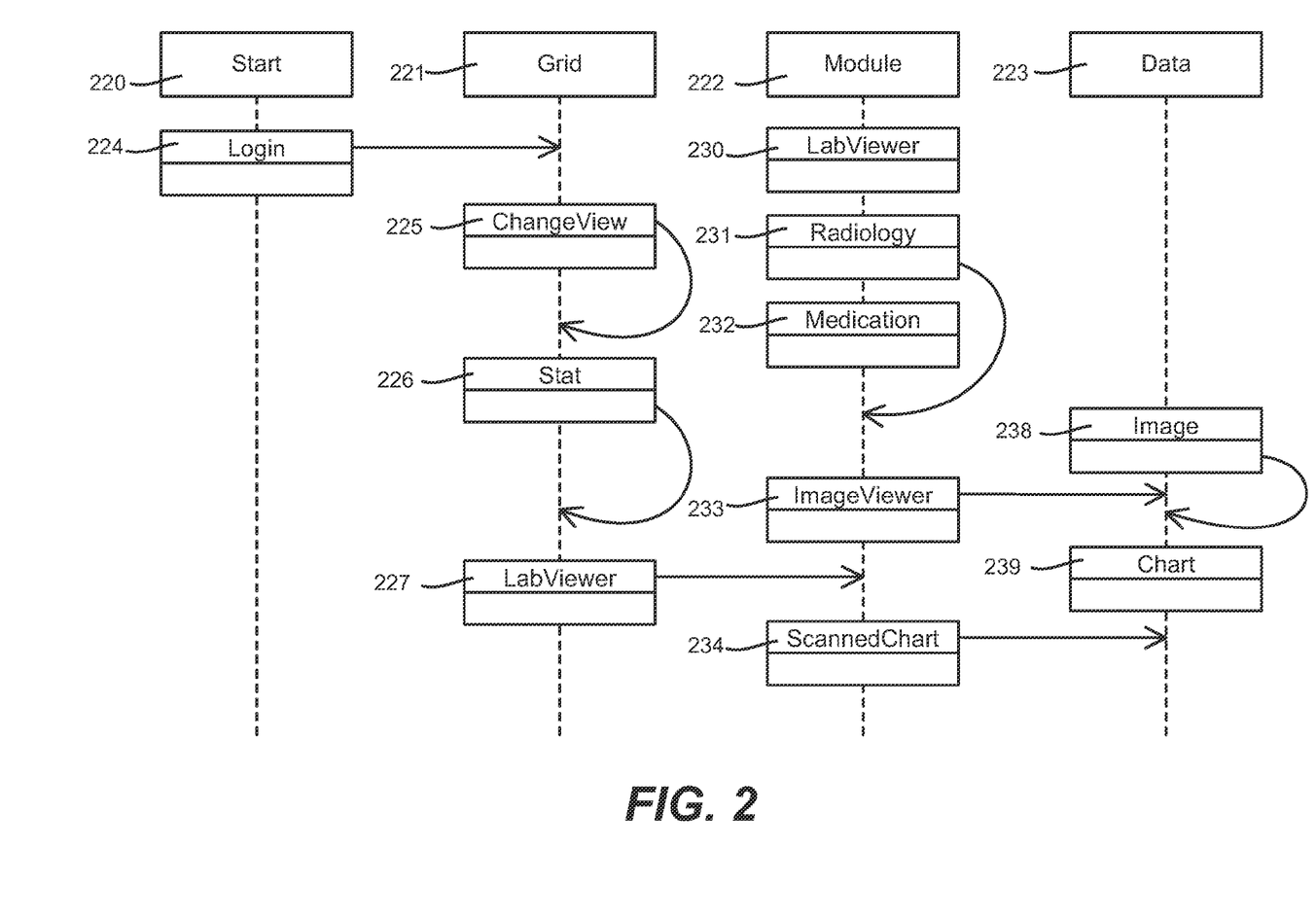
FIG. 2 is an example state diagram in which operations within states may be randomly selected to simulate client activities.

By way of example, FIG. 2 shows four states, namely a start state 220, a grid state 221, a module state 222 and a data state 223. At each state, there are one or more operations, with the arrows in FIG. 2 showing state changes to another state's operations or selecting operations in the same state. Thus, the start state 220 has a Login operation 224 that transitions to the grid state 221, which in turn has a ChangeView operation 225, a Stat operation 226, and a LabViewer operation 227. In this example, the LabViewer operation 227 of the grid state 221 can transition to the module state 222, which includes a (module state) LabViewer operation 230, and Radiology, Medication, ImageViewer and ScannedChart operations 231-234, respectively. The ImageViewer operation 233 and ScannedChart operation 234 can transition to the data state 223, which includes an Image state 238 and a Chart state 239.

Note that states and operations are extendable and configurable. For example, in an implementation such as Amalga® UIS where web method calls are made to defined interfaces to perform operations and access data, the states and/or operations may be extended by extending the defined interfaces. Similarly, allowed transitions from an operation of one state to another state that are useful to evaluate may be configured, e.g., to match what a user can actually do when interfacing with the service.

When testing is complete, the various contexts may be used for generating one or more results logs 122, such as combined in some way into a report that summarizes the test results. Such a results log 122 may be computed at the completion of the testing, or as an ongoing computation. For example, the log may record the number of simulated users, performance data such as the average service response time taken for each type of activity, how much data was downloaded, and so forth. This can help determine how many actual users doing various tasks a service/system can handle at the same time while still being reasonably healthy, how scalable the system is, and so forth, for example.

Turning to the weighting aspect, in general, a real user may perform available operations, including transitioning between states, as desired. This is somewhat random, and thus in simulation is controlled by random number generation so that all possible valid transitions between states and operations can be tested. However, in actual use, state transitions and operations are more likely to follow certain real environment load patterns depending on what users are trying to accomplish. For example, a radiologist will often tend to login, select a patient, load the ImageViewer module and then view image data for that patient, and then repeat for another patient. A doctor interested in lab results will likely follow a different pattern.

In one aspect, to facilitate such different types of pattern evaluations, the otherwise random state transitions and/or operations may be weighted differently from one another depending on what the tester wants to emphasize in testing. For example, in a radiology scenario, the above-exemplified "view image" transitions and operations can be weighted such that this will occur eighty percent of the time, with the other twenty percent of possible operation divided some other way, possibly equally weighted relative to one another.

By way of one XML example of a test configuration, states and the test cases in each state, along with their weights, can be configured as in the following table:

```
<?xml version="1.0" encoding="utf-8" ?>
<Amalga>
<Login server="http://server1:80">
    <Account uid="user1" pwd="123456" />
    <Account uid=" user2 pwd="123456" />
<Login>
<Load value="500">
    <Sleep time="1000" />
</Load>
<Data>
    <Date min="2000-01-01" max="2006-12-31" scope="10" />
</Data>
<StageConfig>
    <Stage name="Start" weight="10">
        <Case name="logincase" weight="100" />
    </Stage>
    <Stage name="Grid" weight="100">
        <Case name="statcase" weight="5" />
        <Case name="viewcase" weight="20" />
        <Case name="labmodule" weight="20" />
    </Stage>
    <Stage name="Module" weight="200">
        <Case name="labmodule" weight="10" />
        <Case name="RadModule" weight="10" />
        <Case name="PMHModule" weight="10" />
        <Case name="AllergyModule" weight="10" />
        <Case name="DicationModule" weight="10" />
        <Case name="PathologyModule" weight="10" />
        <Case name="DiagnosisModule" weight="10" />
        <Case name="PMHModule" weight="10" />
        <Case name="MedicationModule" weight="10" />
        <Case name="imageviewer" weight="10" />
        <Case name="EKGViewer" weight="10" />
        <Case name="ScannedChart" weight="20" />
    </Stage>
    <Stage name="Data" weight="200">
        <Case name="imagedata" weight="20"
        parent="imageviewer" />
    </Stage>
</StageConfig>
</Amalga>
```

As can be seen, the different states (stages) can be weighted differently relative to one another. Also, the different operations within each state can have different weights relative to the other operations of that state.

Moreover, unlike other test solutions such as VSTS (Visual Studio Team Suite), the test mechanism thus may load test with mixed test cases, with weight given to each operation (test case) as described herein. By organizing test cases into different states/operations, and with state change and operation selection in each state controlled by random numbers and weights, the technology described herein more accurately simulates realistic user load.

Figure 3:
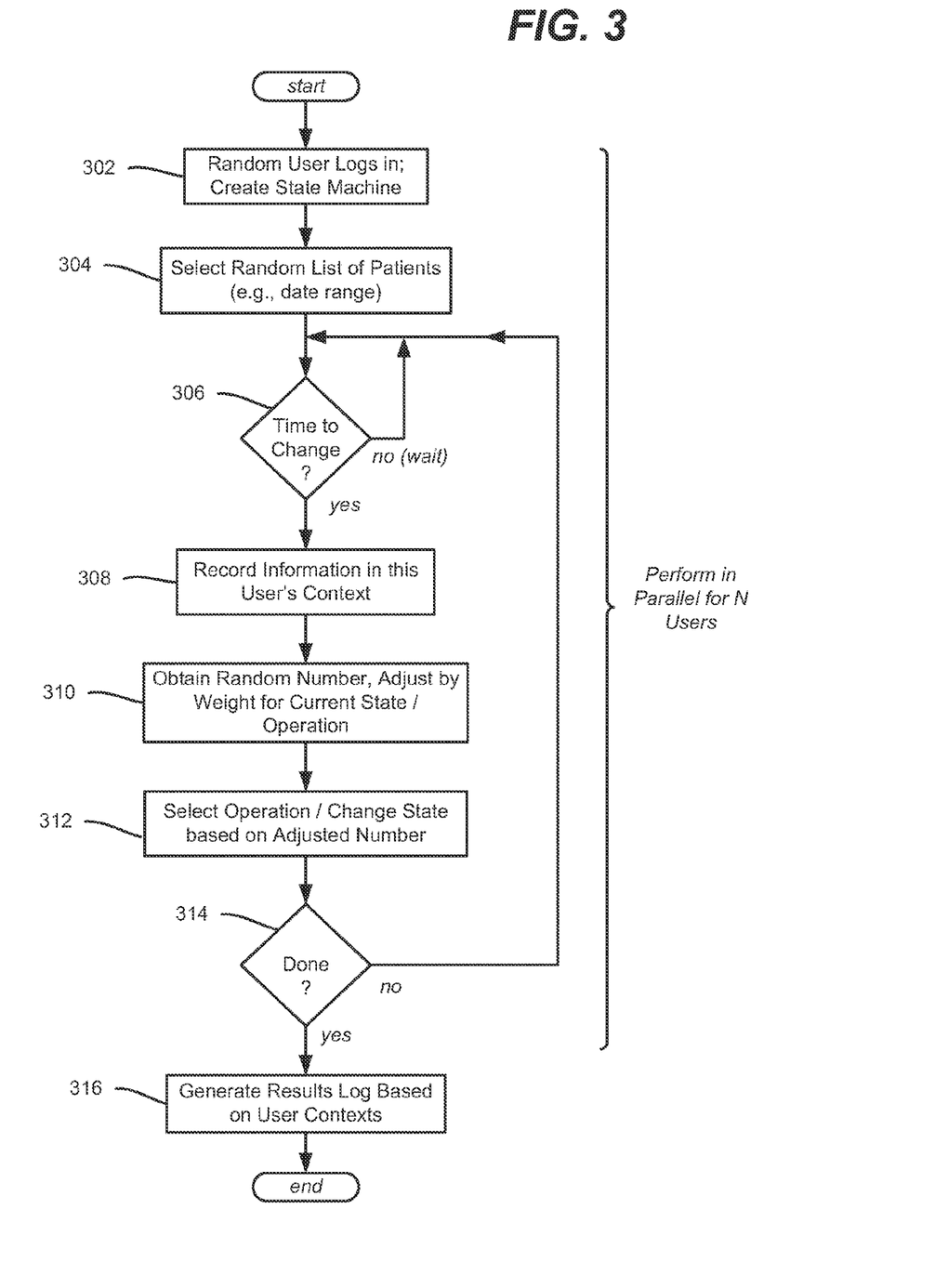
FIG. 3 is a flow diagram showing example steps that may be taken to load test a service with a simulated client load.

FIG. 3 is a simplified flow diagram showing some example steps that may be taken in load testing according as described above. Note that the steps of FIG. 3 are typically run in parallel for multiple simulated users, and that different simulated users may have different tests, different weights and so forth configured for them.

Step 302 represents a random client user logging in, whereby the simulator 116 creates a state machine for this user based on the test configuration data. Note that before login, some evaluation may be made so that no two users are the same at the same time as a result of the same random number being generated as the basis for the user identifier.

Step 304 selects a random list of patients for the user, which as described above, may be based upon a random date range. Note that the size of the date range (e.g., one day or one week) also generally allows obtaining a relatively large list, a relatively small list, or something in between. Further note that this may be an operation, e.g., a user may go back and select a different date range and thus obtain a different patient list while in the same login session.

Step 306 represents waiting until a change is to be made, to select an operation in a different state or select an operation within the current state. As described above, this time may be random to an extent, in conjunction within an appropriate time range for the given state/operation. For example, it may generally take a few seconds to a minute for an actual user to select a patient from the patient list, and this selection time range may be used (possibly biased to some norm) when selecting a patient. If instead the current operation is reviewing an image, the time may range from a few seconds to five minutes. Note that these are not actual numbers, only examples for this description, and that actual times may be measured and used, and possibly biased instead of evenly distributed to more closely match typical usage patterns.

When the time is met, step 308 records information for the operation in the current user context. Examples of such information include the activity that was performed, the time it took the service to respond, and any other relevant information, e.g., time of day, connection latency, exceptions or other error messages, and so on. Note that some of this data may be logged, or combined with any existing data, (e.g., keep the average response time for a given operation, not each response time).

Step 310 represents computing the next operation selection and/or state change/by obtaining and computing a weight-adjusted random number. Step 312 represents selecting and performing the next operation as if an actual user did so via a user interface.

At some time, the test will complete for the simulated user as represented by step 314, and eventually for all simulated users. For example, each user may run through a random number of patients, possibly logging in and out more than once, and when all N users are done, the test is considered complete; (note that during a longer test, a simulated user may log out and then log back in with the same or a different user account, which is a common scenario). Alternatively, the test may be timed, or manually ended.

Step 316 represents generating a results log 122 based on the user contexts, such as to describe the maximum number of simultaneous users, the average response time for each activity, and so forth. This may be combined with other information, such as obtained from the service 102, e.g., how much the server's memory was loaded during the testing.

Thus, in one implementation, each state machine (representing a simulated client user) is configurable with respect to the states, the operations for each state, the weights of states, and the weights of operations in each state. Each state machine has its context that each operation can read/write. In this manner, state machines are able to run randomly, and may thereby be used to realistically simulate the activities of multiple concurrent users.

Exemplary Operating Environment

Figure 4:
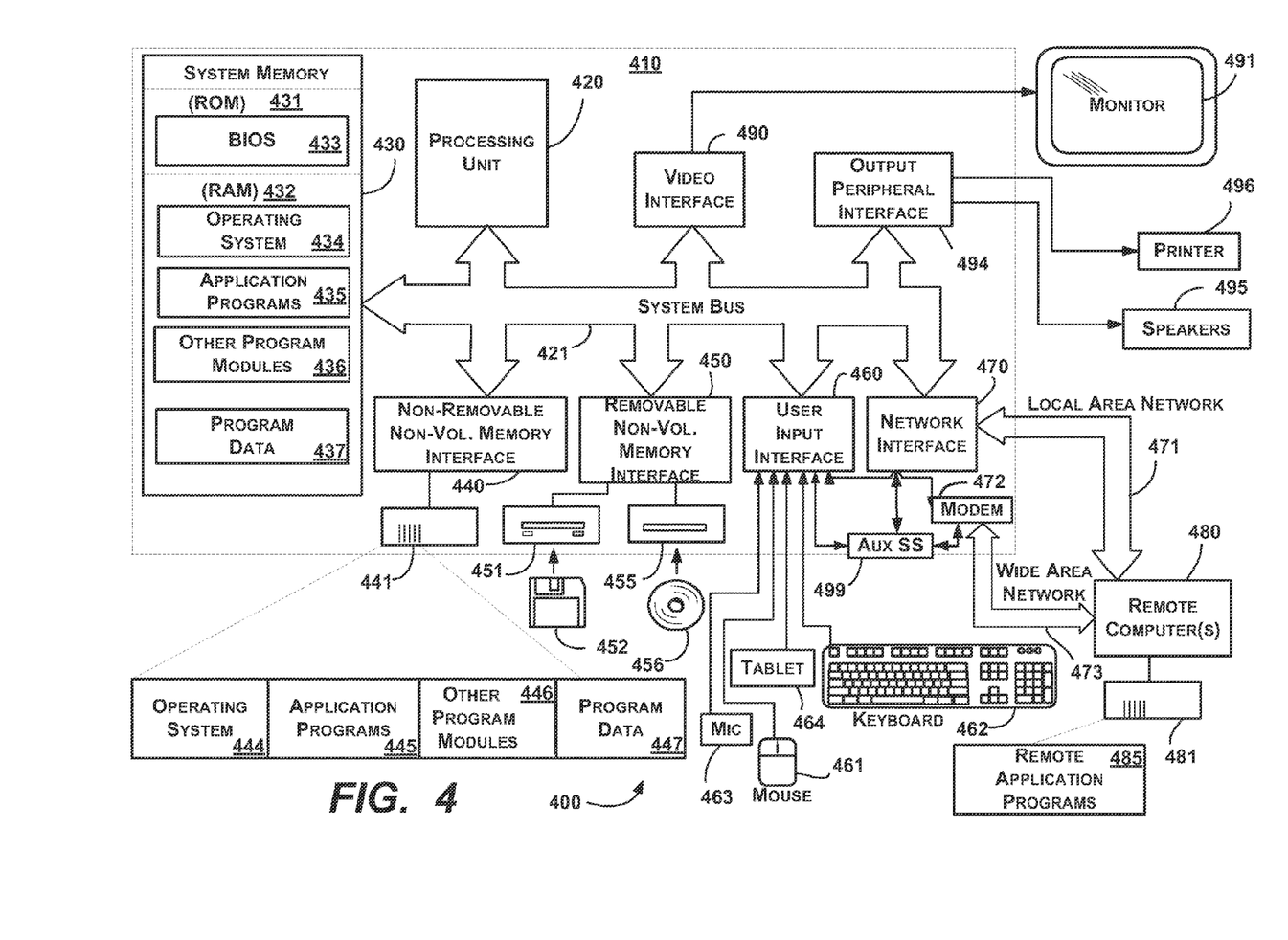
FIG. 4 shows an illustrative example of a computing environment into which various aspects of the present invention may be incorporated.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system for testing a service comprising:
   one or more processors;
   a simulator, implemented on the one or more processors, configured to perform operations of multiple simulated users against the service, including by representing each simulated user as a state machine with context, the simulator configured to randomly select operations within a same state and operations within different states for each simulated user, and to log data indicative of the performance of the service with respect to handling at least some of the operations, wherein at least to two different operations within a state have different weights that bias how often each operation is randomly selected.

2. The system of claim 1 wherein the simulator mixes different test sets by logging in different simulated users during the testing.

3. The system of claim 1 wherein the simulator is further to control a time duration that an operation is performed before selection of another operation.

4. The system of claim 1 wherein the service provides access to medical data of patients.

5. The system of claim 4 wherein the simulator is further configured to select a subset of the patients for each simulated client.

6. The system of claim 1 wherein each state machine is configurable with respect to the states, the operation for each state, relative weights of the states, and relative weights of operations in each state.

7. One or more computer-readable storage media that is not a signal having computer-executable instructions, which in response to execution by a computer, cause the computer to perform steps, comprising:

(a) creating state machines to represent simulated users that are to perform operations against a service, in which each operation in a state machine is associated with one state of a plurality of states;

(b) for each simulated user, selecting an operation to perform based upon a random number and a weight, in which each state has a weight relative to weights of each other state, and each operation has a weight relative to weights at each other operation also associated with that operation's associated state;

(c) performing the selected operation against the service; and (d) repeating steps (b) and (c) as part of a load test of the service.

8. The one or more computer-readable storage media that is not a signal having computer-executable instructions of claim 7 having further computer-executable instructions, comprising, randomly selecting and logging each simulated user into the service, and obtaining a subset of identifiers associated with the service based upon a random date or date range.

9. The one or more computer-readable storage media that is not a signal having computer-executable instructions of claim 7 having further computer-executable instructions comprising controlling a time duration between the current operation and the next operation.

10. The one or more computer-readable storage media that is not a signal having computer-executable instructions of claim 7 having further computer-executable instructions, comprising, recording performance data of the service that corresponds to the service's response time to handle at least some of the operations.

* * * * *